UNITED STATES PATENT OFFICE.

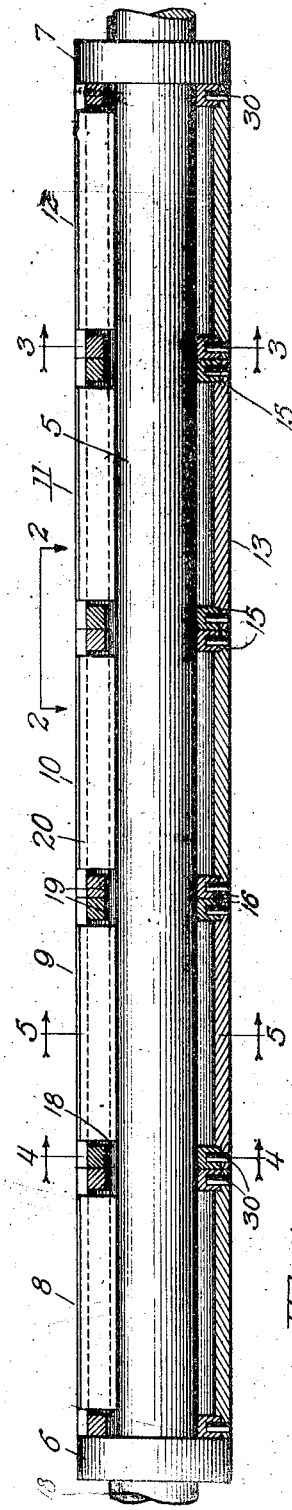
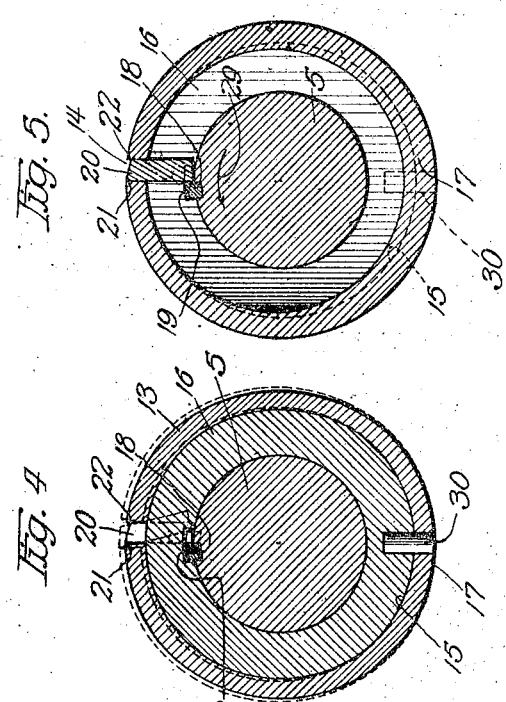
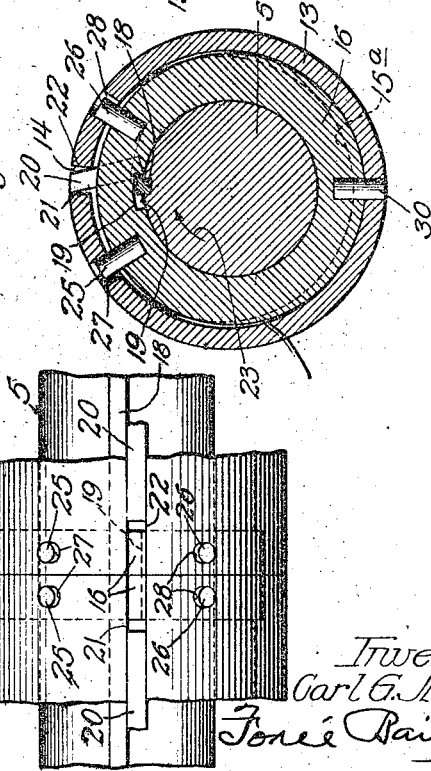
C. G. NAYLOR.
EXPANSIBLE MANDREL.
APPLICATION FILED MAY 23, 1918.
1,296,106. Patented Mar. 4, 1919.
Inventor
Carl G. Naylor

CARL G. NAYLOR, OF CHICAGO, ILLINOIS.

EXPANSIBLE MANDREL.

1,296,106.　　　　Specification of Letters Patent.　　Patented Mar. 4, 1919.

Application filed May 23, 1918. Serial No. 236,114.

*To all whom it may concern:*

Be it known that I, CARL G. NAYLOR, a citizen of the United States, residing at Chicago, in the county of Cook and State of Illinois, have invented certain new and useful Improvements in Expansible Mandrels, of which the following is a specification.

My invention relates to improvements in expanding mandrels.

One of the objects of my invention is to provide an improved expanding mandrel having two, normally substantially concentric members, a driving and a driven member, the latter being automatically expansible by the effect of relative rotary displacement of the members, due to the torque required to overcome the driving lag of the driven member, when the said members are rotated in a given direction, and which automatically contracts its diametric dimension upon cessation of the torque effect, and will not be expanded when rotated in the opposite direction.

Another and more specific object of my invention is to provide a driving member and a surrounding diametrically-expansible longitudinally-split sleeve, and means in a space between the confronting longitudinal edges of the sleeve, produced by the cleavage, movable by the driven member, for separating said edges to increase the effective diameter of the sleeve.

In the illustrative embodiment of my invention, I have shown in the drawings a series of mandrel sections comprising collectively, a composite mandrel, each section being adapted to be expanded to a definite predetermined extent or to a degree limited only by the functional operation of the expanding means.

In the drawings:—

Figure 1 shows a longitudinal central section of the composite mandrel.

Fig. 2 is an enlarged plan view of a fragment of two ends of adjacent sections looking on a portion in the direction of the arrows, indicated by the line 2—2 of Fig. 1.

Fig. 3 is a transverse section taken on line 3—3 of Fig. 1.

Fig. 4 is a similar section taken on line 4—4 of Fig. 1.

Fig. 5 is a similar section taken on line 5—5 of Fig. 1.

In all the views the same reference characters are employed to indicate similar parts.

The drawing shows a driving member or shaft 5 provided with collars 6 and 7, and between the collars and upon the shaft are mounted driven mandrel sections 8, 9, 10, 11 and 12. Each of the driven sections is composed of a sleeve 13, longitudinally split, as at 14. At each end of the sleeve it is counterbored, as shown at 15, to receive a ring 16 that is rotatably loose upon the shaft 5. The sleeve 13 is thicker at its mid-portion, as at 17, and gradually decreases in thickness up to the cleavage edges 14, as shown by the dotted lines 15ª. The object of tapering the sleeve from the point 17 to a diametrically opposite part is to cause it to expand more uniformly throughout its circumferential extent.

The shaft 5 is provided with a longitudinally extending outwardly projecting feather 18 coextensive with the length of the composite mandrel. A plate 20 is placed between abutting ends 21 and 22 of each of the sleeves and when the respective driven sleeve member 13 of the mandrel section is contracted to its maximum extent the plate 20 is brought into radial position, with one edge against the feather 18 in the shaft 5, as shown in Fig. 5. Now when the shaft is turned in the direction of the arrow 23, shown in Fig. 3, the feather 18 will advance ahead of the driven member 13, and thereby carry the lower end of the plate forward. This rotary displacement of the driving member 5, with respect to the driven member 13, will cause the plate 20 to wedge apart, or further separate the confronting longitudinal edges 21 and 22 of the sleeve, thus increasing the diameter of the sleeve.

The extent to which the driven member 13 may be expanded may be limited, when desired, by the stop pins 25 and 26 in the ends of the expansible driven members 13, respectively.

Fig. 3 shows the pins placed radially in the ring 16 and projecting into the slots 27 and 28, of the split sleeve 13, of the mandrel. Figs. 4 and 5 are shown to be not provided with stop pins 25 and 26, therefore, the sections 8, 9 and 10 may be expanded to any extent within the capability of the device when unprovided with said means for limiting the expansion, as shown.

The rings 16 are pinned, or otherwise secured to the sleeve 13, as at 30. The rings 16 are also slotted, as at 19. The feather 18 passes through all of the slots 19 in all of the rings. The slots are sufficiently extensive to permit the feather to have enough free movement therein to carry the bottom ends of the plates 20 forward, as shown in Fig. 3, to properly separate the ends 21 and 22 of the sleeve 13. When the shaft is turned anti-clockwise, as at 29, Fig. 5, the feather 18 engages the ring 16 and rotates the sleeve 13 without expanding it.

My mandrel is especially adapted for the purpose of making spiral pipe in conjunction with a machine that is fully disclosed in my copending patent application serially numbered 179,657, filed July 10th, 1917, and in which a somewhat different form of mandrel is illustrated and described.

It will be observed that the relative rotary displacement of the members 5 and 13, as a result of the torque stress transmitted through said members, is the indirect means by which expansion of the mandrel is effected, and that when the stress is no longer transmitted through the members, the mandrel will automatically contract itself and bring the expanding plates back into radial line, as shown more clearly in Fig. 5.

While I have herein shown a single embodiment of my invention for the purpose of clear disclosure it is manifest to persons skilled in the art that changes may be made in the general configuration and arrangement of the parts within the purview of the appended claims.

Having described my invention, what I claim is:—

1. An expansible mandrel comprising a driving shaft member; a driven, longitudinally split sleeve member thereon and means within the separated edges of the sleeve for enlarging the cleavage to expand the sleeve, operable by the rotation of the shaft.

2. An expansible mandrel comprising a driving shaft member; a driven, longitudinally split sleeve member thereon, and means within the separated edges of the sleeve for enlarging the cleavage to expand the sleeve, automatically operable by the rotary displacement of the driving and driven members.

3. An expansible mandrel comprising a driving shaft member; a driven, longitudinally split sleeve member thereon, means between the separated edges of the sleeve for enlarging the cleavage to expand the sleeve, operable by the relative rotary displacement of the sleeve, and means to positively limit the extent of expansion of said sleeve.

4. A composite mandrel comprising a series of transversely separated mandrel sections, each section provided with an expansible sleeve; a shaft upon which said sleeves are mounted; means automatically operable by the relative rotary displacement of said shaft and sleeves to expand the sleeves.

5. A composite mandrel comprising a series of transversely separated independently expansible mandrel sections, each section provided with an expansible sleeve; a shaft upon which said sleeves are mounted; means automatically operable by the relative rotary displacement of said shaft and sleeve to expand the sleeve and means to positively limit the expansion of one or more sleeves.

6. A composite mandrel comprising a series of transversely separated mandrel sections, each section provided with an expansible part constituting the driven member; a shaft upon which said driven member is mounted; means between said shaft and driven member to expand the latter upon relative rotary displacement of said driving and driven members and stops to positively limit the extent of expansion of selected mandrel sections.

7. A mandrel comprising a shaft; a feather extending longitudinally thereof; a split sleeve on said shaft, encompassing the feather; a radially disposed plate between the separated edges of the sleeve adapted to have its base rotatably displaced by said feather to expand the sleeve when the shaft is rotated.

In testimony whereof I hereunto subscribe my name.

CARL G. NAYLOR.